(No Model.)

C. C. ANDERSON.
TRICYCLE.

No. 359,000. Patented Mar. 8, 1887.

WITNESSES:

INVENTOR:
C. C. Anderson
BY Munn & Co.
ATTORNEYS.

UNITED STATES PATENT OFFICE.

CHARLES CRAWFORD ANDERSON, OF MORGAN CITY, LOUISIANA.

TRICYCLE.

SPECIFICATION forming part of Letters Patent No. 359,000, dated March 8, 1887.

Application filed July 24, 1886. Serial No. 209,024. (No model.)

*To all whom it may concern:*

Be it known that I, CHARLES CRAWFORD ANDERSON, of Morgan City, in the parish of St. Mary's and State of Louisiana, have invented a new and useful Improvement in Tricycles, of which the following is a full, clear, and exact description.

My invention relates to an improvement in tricycles, and has for its object to effect an increase in the speed thereof.

It consists in attaching to each end of a treadled crank-shaft a grooved wheel, whereby motion is communicated to the main crank-shaft by means of pitmen attached thereto, and in the details of construction of the frame and steering-bar, as will be hereinafter fully set forth and claimed.

Reference is to be had to the accompanying drawings, forming a part of this specification, in which similar letters of reference indicate corresponding parts in all the figures.

Figure 1:
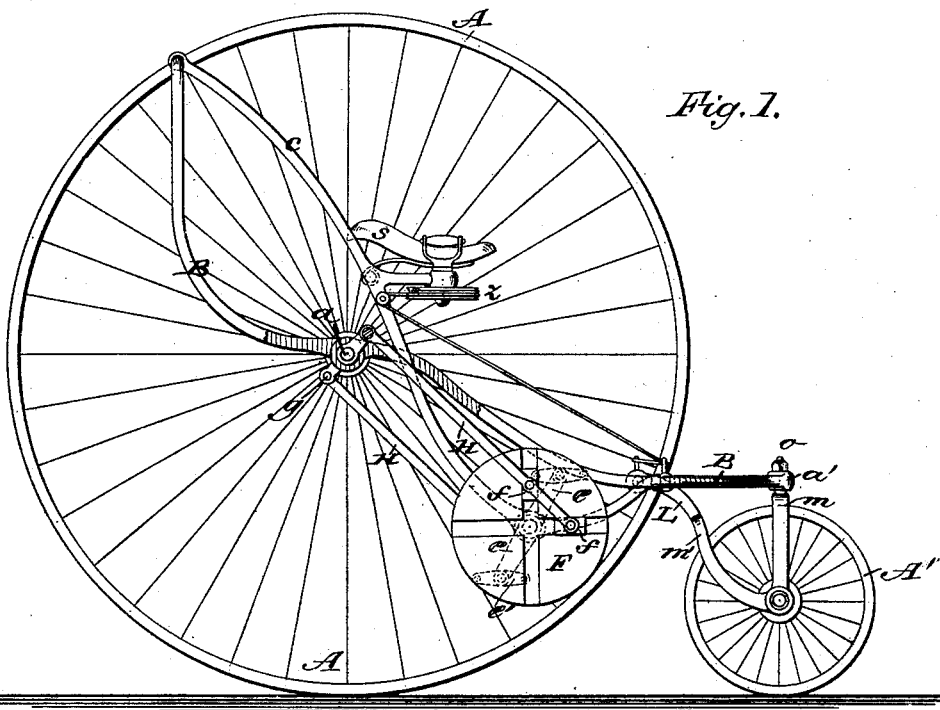
Figure 2:
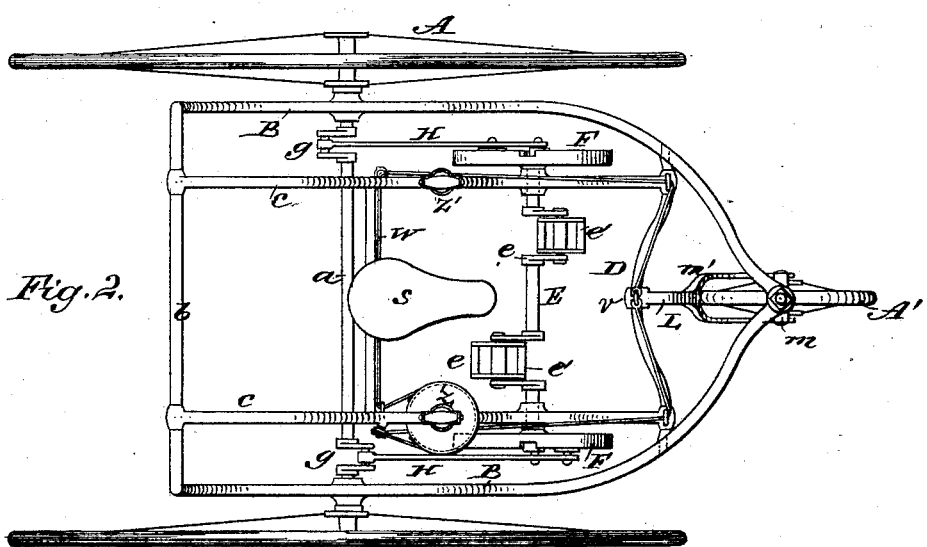
Figure 3:
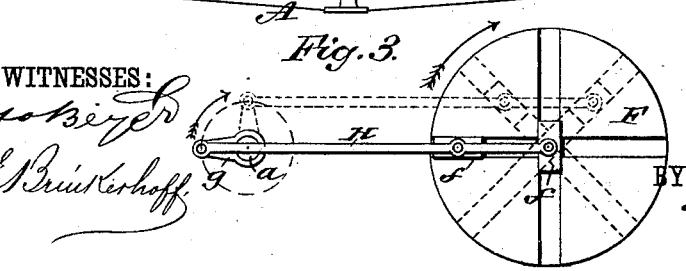

Figure 1 is a side elevation of my tricycle with a wheel removed and one side of the frame cut away. Fig. 2 is a plan view thereof; and Fig. 3, a detail view illustrating the connection of the grooved wheel with the axle crank-shaft, and indicating in dotted lines a partial revolution thereof.

The tricycle is provided with two large drive-wheels, A A, of the ordinary construction, secured to an axle crank-shaft, $a$, journaled in the side bars, B, of the frame. This frame consists of said side bars, B, which extend parallel on each side inside the wheels A A from a point to the rear of a vertical line through their center, and about the height thereof down vertically a distance, curving to receive the said axle crank-shaft $a$, and, continuing downward in a compound curve, they are rounded in toward and are united at the center in front, forming a re-enforced eye, $a'$, at their point of unity, the rear vertical ends of the side bars, B, being connected by a cross-bar, $b$, completing the outer frame of the tricycle. Extending from and secured to the cross-bar $b$, one upon each side, and within the frame, are brace-bars C C, which are united to the side bars, B, of the frame in front by means of a rearwardly-curved guide-bar, D. Journaled in these brace-bars C C is a shaft, E, having cranks $e$ $e$ therein, provided with proper foot-treadles, $e'$, and carrying upon each end, outside the said brace-bars C C, between them and the outer frame, a grooved wheel, F, keyed thereto. Adapted to slide in the grooves of the wheel F are blocks $ff$, which are connected to the cranks $g$ $g$, formed in the axle-shaft $a$ outside the brace-bars C C, by a pitman, H, pivoted thereto.

Upon a cross-brace, W, extending from the one brace-bar C to the other, is affixed a seat, S, for the rider, in such position as that the treadled crank $e$ upon the shaft F can be operated by the feet of the person seated thereon without trouble.

The small front guide-wheel, A', is straddled by the two U-shaped arms $m$ $m'$ of the forked steering-bar L, the axle of the said wheel A' being journaled within the U-shaped arms at their intersection. The one arm, $m$, extends vertically above the wheel, a branch of the U upon each side thereof, which, uniting over the tire of the wheel, is provided with a central pin, $o$, adapted to loosely enter, so as to turn therein, the eye $a'$, formed in the intersecting side bars, B, of the frame. The other arm, $m'$, of the forked steering-bar L curves upwardly, one branch of the U upon either side of the wheel integral with the vertical arm $m$, which, uniting over the tire of the wheel A a short distance below the arm $m$, merges up into the curved steering-bar L, which forms a connection with the outwardly-curved guide-bar D, upon which it slides by means of an eye, $v$, formed in the end.

The eye $v$ upon the arm $m'$ of the forked steering-bar L is provided with a ring or staple, from which wires extend along the guide-bar D, upon each side and along the brace-bar C to a steering-wheel, Z, of the usual construction in tricycles, adapted to be operated by the right hand of the rider, in the usual manner. This steering-wheel is placed upon the right-hand brace-bar, and a hand-hold, Z', is provided upon the left-hand brace-bar, adapted to be grasped by the rider's left hand, enabling him to keep himself well braced in the saddle.

In steering my tricycle the forked steering-bar, consisting of the U-shaped arms $m$ $m'$, through the eye $v$ upon the curved end of the arm $m'$, travels either to the right or left, as the rider may happen to turn the steering-wheel Z upon the curved guide-rod D, and the incased guide-wheel A' is enabled to turn in response thereto by the pivotal engagement of the pin *o* in the top of the arm *m* with the eye *a'* of the frame.

In the construction the grooved wheel is made twice the circumference of the circle prescribed by the revolution of the crank *g* upon the axle-shaft *a*, as thus I obtain in operation to every revolution of the grooved wheels F, two revolutions of the crank axle-shaft *a*, and consequently two revolutions of the drive-wheels A.

Should the drive-wheel be five feet in diameter, the one revolution of the grooved wheels upon the treadle crank-shaft E will propel the tricycle thirty feet. This I illustrate in part in Fig. 3 of the drawings. The dotted lines show that when the grooved wheel F takes an eighth-turn the axle-crank *g* will have made a quarter-revolution.

Thus I am enabled to attain a greater speed than has been attained heretofore without expending much more power.

Having thus fully described my invention, I claim as new and desire to secure by Letters Patent—

1. A tricycle constructed with side bars, B, cross-bars *b*, a main crank-shaft, *a*, journaled in said side bars, and the grooved wheels F, keyed to a treadled crank-shaft, E, journaled in the brace-bars C, adapted to operate the crank *g* of the main shaft *a* by the pivoted sliding blocks *f* and pitman H, substantially as shown and described, for the purposes herein set forth.

2. In a tricycle, the combination, with the frame thereof, consisting of side bars, B, and cross-piece *b*, of a guide-bar, L, having two U-shaped arms, *m m'*, adapted to straddle the guide-wheel A' and form a bearing for its axle, the said guide-bar L pivoted to the intersecting side bars, B, by the pivot-pin *o* upon the arm *m*, and adapted to slide upon a guide-rod, D, connected with the said frame by means of the eye *v*, formed in its end, substantially as shown and described, and for the purpose herein set forth.

CHARLES CRAWFORD ANDERSON.

Witnesses:
S. NELSON,
THOMAS SHANNON.